Sept. 13, 1966     L. H. MURPHEY     3,273,020

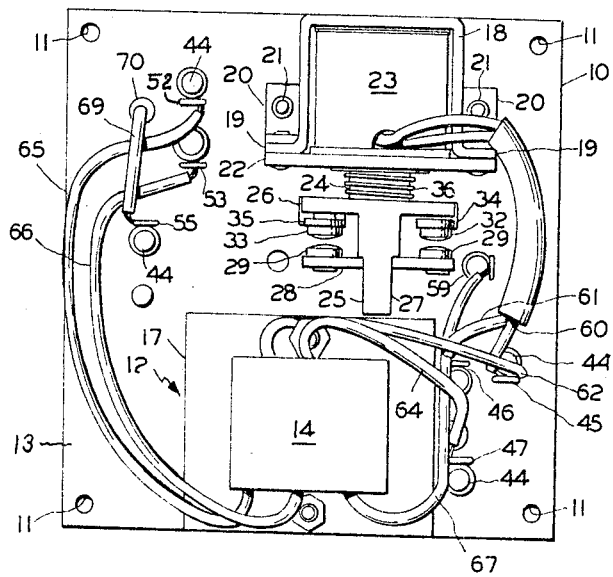

CONTROL APPARATUS

Filed Oct. 22, 1964     2 Sheets-Sheet 2

INVENTOR
LLOYD H. MURPHEY

BY *Robert D. Sommer*

AGENT

United States Patent Office 3,273,020
Patented Sept. 13, 1966

3,273,020
CONTROL APPARATUS
Lloyd H. Murphey, Logansport, Ind., assignor to Essex Wire Corporation, Fort Wayne, Ind., a corporation of Michigan
Filed Oct. 22, 1964, Ser. No. 405,765
3 Claims. (Cl. 317—99)

This invention relates to control apparatus for refrigeration systems and more particularly to a control apparatus for electric motors driving a refrigerant compressor.

Air conditioning units using motor driven refrigerant compressors usually employ a contactor or relay to connect the compressor motor to an electric power source. The contactor or relay may also control the energization of the motor of a fan which moves air over the condenser coil of the air conditioning unit. A room or zone thermostat usually controls the energization of the coil of the contactor or relay from the low voltage winding of a transformer. In the past, the contactor and the transformer have been located at various positions within and without the air conditioning unit. This has required relatively complex wiring for the control system of the air conditioning unit which is somewhat difficult and expensive to install and service.

It is therefore an object of this invention to provide a simple, inexpensive and compact control apparatus for air conditioning units incorporating a contactor and a transformer which may be readily installed and easily serviced.

A feature of this invention is that of assembling the components of a contactor, a transformer and a plurality of terminals upon a single insulating panel which may be readily mounted within an air conditioning unit with free and easy access for the making of electrical connections to the circuits of the air conditioning unit.

These and other features of the invention will be apparent from a consideration of the following description with reference to the accompanying drawing in which:

FIGURE 1 is a rear plan view of a control apparatus embodying the invention;

FIGURE 2 is a front plan view of the control apparatus;

Figure 3:
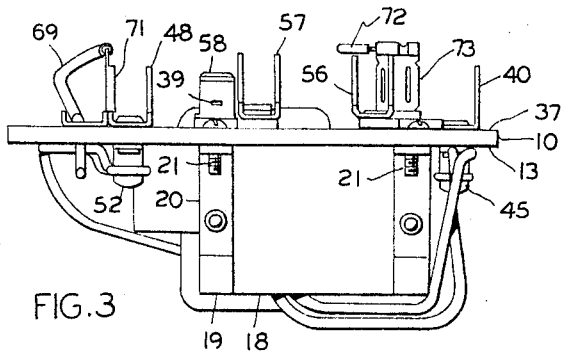
FIGURE 3 is a top view of the control apparatus.
Figure 4:
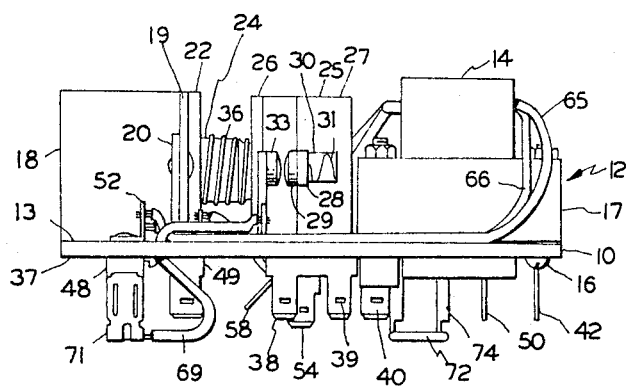
FIGURE 4 is an elevational view looking at the left hand side of the control apparatus as viewed in FIGURE 1.

Referring first to FIGURES 1-4 of the drawing, the several parts of the control apparatus are all mounted upon a supporting plate or panel 10 composed of a rigid insulating material. The panel 10 is provided with suitable apertures 11 at its corners by which the panel may be secured by screws to a wall or frame of an air conditioning unit. A shell type step-down transformer 12 is mounted upon the rear face 13 of the panel 10 with one side of the transformer coil 14 projecting through the rectangular opening 15 in the panel. The transformer 12 is secured to the panel 10 by a pair of screws 16 passing through the transformer core 17 and the panel 10.

Also mounted on the rear face 13 of the panel 10 is a contactor having a substantially U-shaped magnetic frame 18 with outwardly extending flanges 19. Attached to the flanges 19 are mounting brackets 20 through which pass screws 21 to secure the frame 18 to the panel 10. A face plate 22 of magnetizable material is attached to the flanges 19 and with the frame 18 surrounds a coil 23. The face plate 22 and the coil 23 have aligned bores (not shown) in which a core or armature 24 reciprocates. Molded or otherwise attached to the free end of the armature 24 is a contact carrier 25 of insulating material. The contact carrier 25 has a base portion 26 with an integral contact support arm 27. A contact bar 28 having a contact 29 at each end extends through a rectangular opening 30 in the support arm 27 and is retained in the opening 30 by a coil spring 31. The contacts 29 are arranged to engage stationary contacts 32 and 33 fixed to bus bars or L-shaped brackets 34 and 35, respectively, which are secured to the panel 10. The contact carrier 25 is biased by a coil spring 36 against the brackets 34 and 35 with the result that the movable contacts 29 are normally separated from the stationary contacts 32 and 33. When the coil 23 is energized, the armature 24 is attracted in opposition to the biasing force of the spring 36 causing the engagement of the contacts 29 with the contacts 32 and 33. Upon deenergization of the coil 23, the armature 24 and the contact carrier 25 are returned to their original positions by the spring 36.

The front face 37 of the panel 10 carries a plurality of male or spade terminals of a well known form consisting of a flat tongue 38 of sheet metal having a central indentation 39 in each face. The male terminals may receive receptacle terminals of the type disclosed in United States Patent No. 2,600,190 issued June 10, 1952 to Hugh W. Batcheller. The terminals 40, 41 and 42 each have a single tongue 38 and a base portion 43 which is attached to the panel 10 by a rivet 44. The rivets 44 also secure the connection lugs 45, 46 and 47 to the rear face 13 of the panel in electrical connection with the respective terminals 40, 41 and 42. Also attached to the panel 10 are three U-shaped terminals 48, 49 and 50 each having two tongues 38 electrically connected by a connecting base portion 51. The terminals 48 and 49 are electrically connected by rivets 44 to connections lugs 52 and 53, respectively, on the panel rear face 13. A similar terminal 54 with four tongues 38 is electrically connected by a rivet 44 with another connection lug 55 on the panel rear face 13. A terminal 56 is secured in electrical connection with the contact bracket 34 while two terminals 57 and 58 are secured in electrical connection with the contact bracket 35. Another connection lug 59 on the panel rear face 13 is connected to the contact bracket 34.

The leads 60 and 61 of the coil 23 are secured to the connection lugs 45 and 46, respectively, as by soldering. One lead 62 of the transformer secondary winding 63 is also secured to the connection lug 45 and the other lead 64 is secured to the connection lug 47. The leads 65, 66 and 67 of the transformer primary winding 68 are secured to the connection lugs 52, 53 and 59, respectively. A wire 69 extending through the hole 70 in the panel 10 has one end secured to the lug 55 and the other end attached to a receptacle terminal 71 which is seated on one tongue 38 of the terminal 48. A jumper connection between the terminals 41 and 50 is provided by a wire 72 having receptacle terminals 73 and 74 secured at its ends and seated upon the tongues 38 of the terminals 41 and 50, respectively. It will be apparent from the foregoing that all connections to the transformer, the contactor coil and the contactor stationary contacts are accessible at the terminals on the front face 37 of the panel 10. The terminals 49, 54, 56 and 57 with 58 each form a bus bar for connection of several external circuit wires each having a suitable receptacle terminal.

Figure 5:
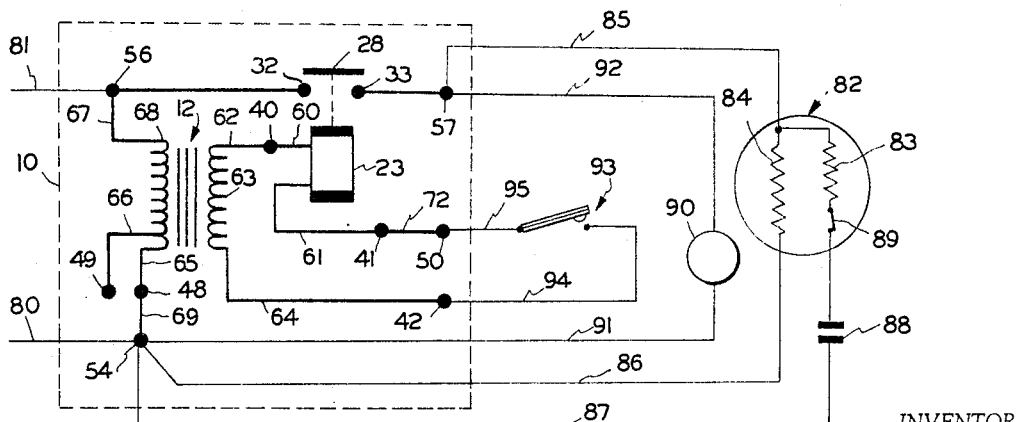
FIGURE 5 is a wiring diagram showing the electrical connections involved in the control apparatus.

FIGURE 5 shows by way of example one type of an air conditioning unit control system in which the control apparatus of the present invention may be utilized. The parts indicated schematically with heavy lines are those shown in FIGURES 1-4 and are designated by the same reference numerals. The terminals 54 and 56 are shown connected to a single phase power circuit represented by the supply lines 80 and 81. The electric motor 82 for driving a refrigerant compressor has the common terminal of its starting winding 83 and its running winding 84 connected by the line 85 to the terminal 57. The other terminal of the running winding 84 is connected to the terminal 54 by the line 86 while another line 87 connects the other terminal of the starting winding 83 to the terminal 54 by way of the usual capacitor 88 and the motor centrifugal switch 89. Also connected to the terminals 54 and 57 by the lines 91 and 92, respectively, is an electric motor 90 which drives a fan for cooling the condenser coil of the air conditioning unit. A thermostat 93 located in the space to be cooled by the air conditioning unit is connected by the lines 94 and 95 to the terminals 42 and 50, respectively. It will be understood that receptacle terminals such as described in the aforesaid U.S. Patent No. 2,600,190 may be secured to the end of each line and that the connection of the lines to the spade terminals of the panel 10 may be quickly and easily made by pushing the receptacle terminals upon the spade terminals. Suitable indicia may be marked upon the panel 10 to indicate the desired connections.

In operation of the system shown in FIGURE 5, the primary winding 68 of the transformer 12 is energized at all times and the low voltage of the secondary winding 63 is present at the terminals 40 and 42. When the thermostat 93 closes in response to a need for cooling, the contactor coil 23 is energized causing the contact bar 28 with its contacts 29 to bridge the stationary contacts 32 and 33. The closing of the contacts completes energizing circuits to the compressor motor 82 and the fan motor 90. These motors will continue to operate unitl the termostat 93 opens and the contactor coil 23 is de-energized.

The system shown in FIGURE 5 is merely exemplary of one application of the invention and the invention is applicable to various modifications of this air conditioning unit system. For instance, the jumper connection 72 may be disconnected from the terminals 41 and 50 and the contacts of an overcurrent, temperature or pressure control may be connected to those terminals. The terminal 71 on the lead wire 69 may be transferred from the terminal 48 to the terminal 49 for operation of an air conditioning unit from a lower voltage power source. A low voltage control device such as a relay for an evaporator fan motor may be connected to the terminals 40 and 42 for energization from the transformer 12. A potential type motor-starting relay may be connected to the terminals of the control apparatus for use with a compressor motor having no centrifugal starting switch.

It will be seen that the transformer, the contactor and the terminal connections for an air conditioning unit are compactly carried by a single panel which may be easily installed in an air conditioning unit with ready access to the terminals.

Various changes in the shape, size and arrangement of parts may be made to the form of the invention herein shown and described without departing from the scope of the invention as defined in the following claims.

What is claimed is:
1. Control apparatus for an electric motor driving a refrigerant compressor of an air conditioning unit which is controlled by a thermostatic switch comprising:
 (a) an insulating mounting panel having a front surface and a rear surface and provided with an opening therethrough;
 (b) an electrical transformer of the type in which a shell-type core partially encloses a coil having portions protruding from two opposite sides of said core, said coil comprising a primary winding having two leads and a low voltage secondary winding having two leads;
 (c) means securing the core of said transformer to the rear surface of said panel adjacent said opening with one portion of said coil projecting through said opening and beyond said front surface;
 (d) an electromagnet having a coil with two leads and a core-type armature;
 (e) means securing said electromagnet upon the rear surface of said panel with the armature axis parallel and close to said rear surface;
 (f) a contact carrier of insulating material attached to an exposed end of said armature and carrying a bridging contact means movable with said armature;
 (g) first and second brackets secured to said panel in spaced-apart relation and extending above said rear surface of said panel in the path of movement of said bridging contact means;
 (h) stationary contacts on said brackets positioned to be engaged by said bridging contact means when the armature is attracted by the electromagnet coil;
 (i) first and second terminals secured on the front surface of said panel in electrical connection with said brackets;
 (j) third, fourth and fifth terminals secured on the front surface of said panel;
 (k) means connecting one lead of said transformer primary winding to said first terminal and means connecting the other lead of said primary winding to said third terminal; and
 (l) means connecting one lead of said electromagnet coil to one lead of said transformer secondary winding, means connecting the other lead of said electromagnet coil to said fourth terminal, and means connecting the other lead of said secondary winding to said fifth terminal.

2. Control apparatus according to claim 1 wherein said contact carrier has a base portion resiliently biased against one side of said brackets and a support arm portion extending from said base portion between said brackets and supporting said bridging contact means adjacent the side of said brackets opposite said sides engaged by said base portion.

3. Control apparatus according to claim 1 wherein at least said first, second and third terminals comprise a U-shaped member having a connecting portion secured to said panel and two terminal tongues of the spade type.

No references cited.

ROBERT K. SCHAEFER, *Primary Examiner.*